(12) United States Patent
Wang

(10) Patent No.: US 7,812,830 B2
(45) Date of Patent: Oct. 12, 2010

(54) TOUCH-INITIATED POWER-SAVING CLOCK SYSTEM AND METHOD FOR TOUCH SCREEN CONTROLLER

(75) Inventor: Ing-Yih Wang, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 883 days.

(21) Appl. No.: 11/716,831

(22) Filed: Mar. 12, 2007

(65) Prior Publication Data
US 2008/0225009 A1 Sep. 18, 2008

(51) Int. Cl.
*G06F 3/045* (2006.01)
(52) U.S. Cl. ...................... 345/174; 345/173
(58) Field of Classification Search ............... 345/173, 345/156, 174, 179
See application file for complete search history.

(56) References Cited

U.S. PATENT DOCUMENTS

| 5,777,604 | A * | 7/1998 | Okajima et al. ............ 345/173 |
|---|---|---|---|
| 6,236,386 | B1 * | 5/2001 | Watanabe ..................... 345/98 |
| 6,246,394 | B1 | 6/2001 | Kalthoff et al. ............. 345/173 |
| 6,738,048 | B1 | 5/2004 | Rundel ........................ 345/173 |
| 2004/0095266 | A1 * | 5/2004 | Kernahan et al. ........... 341/165 |
| 2004/0100450 | A1 * | 5/2004 | Choi ............................ 345/173 |
| 2008/0143691 | A1 * | 6/2008 | Cook ........................... 345/179 |

* cited by examiner

*Primary Examiner*—Richard Hjerpe
*Assistant Examiner*—Jeffrey Parker
(74) *Attorney, Agent, or Firm*—John J. Patti; Wade J. Brady, III; Frederick J. Telecky, Jr.

(57) ABSTRACT

A touch screen controller circuit (1A) including means for generating a first and second levels of a pen touch signal (PENTOUCH) if a touch point (Q) is present or absent, respectively. A clock start signal (CLKSTART) is generated in response to the first level. An internal clock signal (INTCLK) is generated in response to the clock start signal. First and second levels of a synchronized pen touch signal (PENTOUCH1) corresponding to the first and second levels, respectively, of the pen touch signal are generated in response to the internal clock signal. A stop clock signal (CLKSTOP) is generated in response to the second level of the synchronized pen touch signal. The internal clock signal (INTCLK) is stopped in response to the clock stop signal.

23 Claims, 4 Drawing Sheets

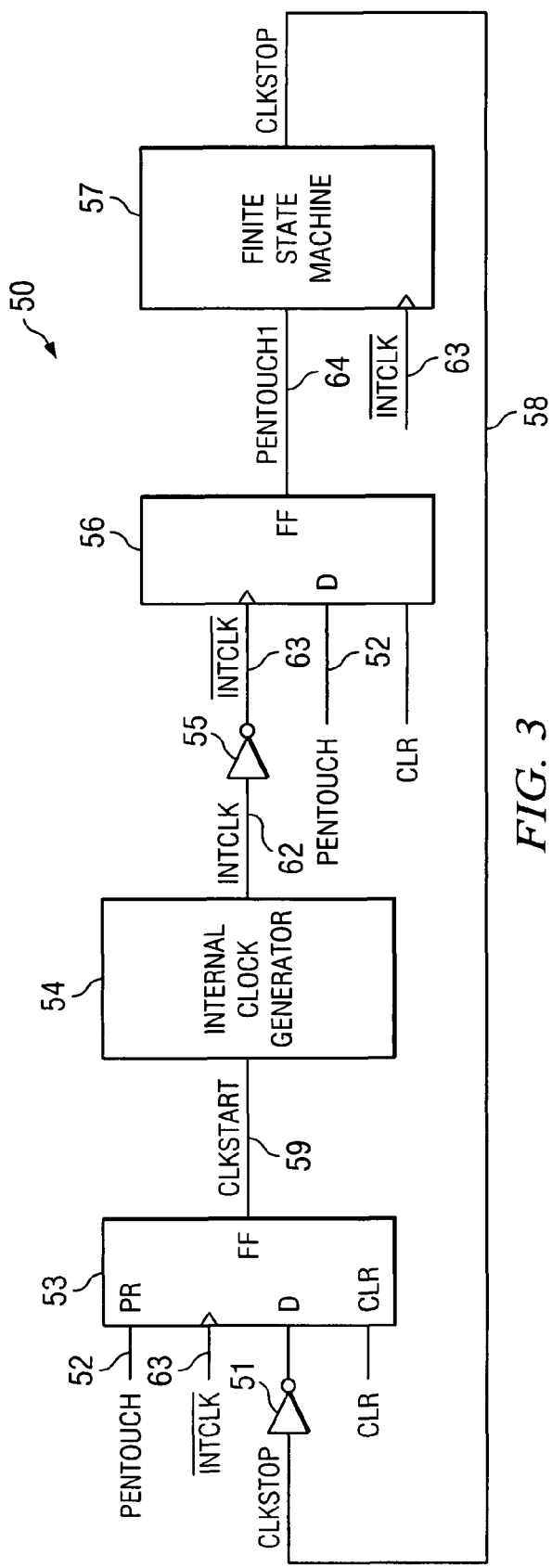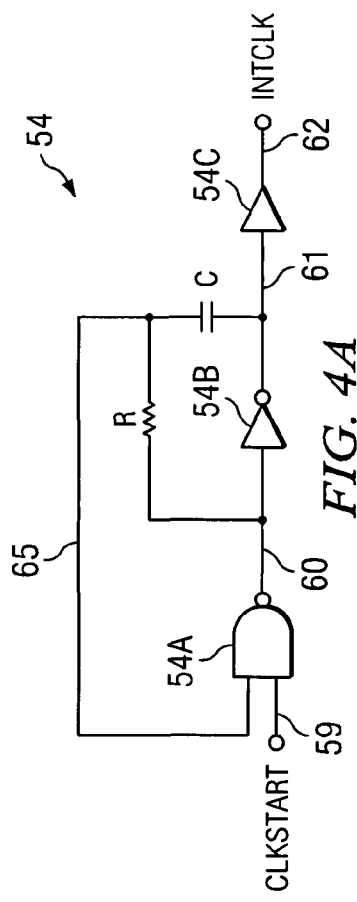
FIG. 3
FIG. 4A

TOUCH-INITIATED POWER-SAVING CLOCK SYSTEM AND METHOD FOR TOUCH SCREEN CONTROLLER

BACKGROUND OF THE INVENTION

The present invention relates generally to touch screen controllers, and more particularly to improved pen-touch detection circuitry and methods therein which consume less power than the prior art in-touch detection circuitry.

The prior art is believed to include commonly assigned U.S. Pat. No. 6,246,394 entitled "Touch Screen Measurement Circuit and Method" issued Jun. 12, 2001 to Kalthoff et al., incorporated herein by reference. Also, commonly assigned U.S. Pat. No. 6,738,048 entitled "Touch Screen Controller" issued May 18, 2004 to Bernd M. Rundel, also incorporated herein by reference, is indicative of the state of the art.

As shown in "Prior Art" FIG. 1 herein, the '394 patent discloses a touch screen digitizing system which includes a touch screen unit or assembly 30,31 including a first resistive screen 30 with opposed x+ and x− terminals, a second resistive screen 31 with opposed y+ and y− terminals, and an ADC 22. The various terminals of touch screen assembly 30, 31 are connected to corresponding terminals of a touch screen controller (TSC) chip 1A including a first switch 19 which is coupled between a first reference voltage (ground) and the x− terminal, and a second switch 18 which is coupled between the x+ terminal and a second reference voltage $+V_{CC}$ for energizing the first resistive screen 30. A third switch 21 is coupled between ground and the y− terminal, and a fourth switch 20 is coupled between the y+ terminal and $V_{CC}$ for energizing the second resistive screen 31. Switching circuitry 15, 17 couples an input of the ADC 22 to the y+ terminal while the first resistive screen 30 is energized and the second resistive screen 31 is not energized, and also couples the input to the x+ terminal while the second resistive screen 31 is energized and the first resistive screen 30 is not energized.

More specifically, the various terminals of the resistive screens 30 and 31 are connected to the drains of the various corresponding driver transistors 18, 19, 20 and 21. The structure provides continuous calibration of the full-scale analog touch screen output of the full-scale digital output of the ADC 22. Control circuit 41 controls the various driver transistors, switches, and ADC 22 by means of conductors 42, and also includes a data register 48 which receives/updates the analog to digital conversion results from ADC 22 so they are available to be read by the host processor 3 by a control/data bus 40. Control circuit 41 also can generate a processor interrupt request signal IRQ on conductor 47. Touch screen controller 1A of FIG. 1 also includes pen-touch detection circuit 2A shown in FIG. 2.

FIG. 2 shows a simplified diagram prior art pen-touch detection circuit 2A which is included in touch screen controller 1A of FIG. 1. Touch screen assembly 30, 31 in FIG. 2 includes the x resistive sheet 30 and the y resistive sheet 31 as shown in FIG. 1. Pen-touch detection circuit 2A includes N-channel driver transistor 21 of FIG. 1 coupled between y−conductor 25 and ground, with its gate connected by conductor 46 to control unit 41.

x+ conductor 27 is coupled to the source of N-channel transistor 32, the drain of which is connected by conductor 36 to one terminal of a pull-up resistor 39, to the input of a buffer circuit 38, and to the drain of a N-channel transistor 35 having its source connected to ground. The other terminal of pull-up resistor 39 is connected to $V_{DD}$. The gate of transistor 32 is connected to the output of an inverter 33 having its input connected by conductor 34 to control unit 41A. The gate of transistor 35 is connected by conductor 45 to control unit 41. The output of buffer circuit 38 produces a pen-touch signal PENTOUCH on conductor 37 and applies it to an input of control unit 41A. Control unit 41 produces an interrupt request signal IRQ on conductor 47 and applies it to an interrupt request input of host processor 3.

Prior art touch detection circuitry 2A in FIG. 2 indicates whether or not there presently is a touch point Q at which there is electrical contact between the x resistive sheet 30 and the y resistive sheet 31 (FIG. 1) due to pen-touch pressure at on touch screen assembly 30,31 at the point Q. When transistor 21 is turned on, pen touch detection circuit 2A is ready for pen-touch detection operation. There is a current path from $V_{DD}$ to ground, through pullup resistor 39, through transistor 32, x+ port conductor 27, the x and y touch screen resistances connected by the electrical contact effectuated by the touch point Q, and driver transistor 21. The signal IRQ generated by touch screen controller 1A (FIG. 1) on conductor 47 can represent a interrupt request for a "convert" command from host processor 3.

Transistor 35 in FIG. 2 is turned on in response to a signal from control unit 41 via conductor 45 in order to "hold" or maintain the pen-touch detection signal PENTOUCH at a low level after a touch point Q has been detected, because as soon as that happens, transistor 32 must be turned off to isolate the touch point coordinate conversion circuitry from the pen-touch detection circuitry so that control unit 41 can turn on the various driver transistors 18, 19, 20 and 21 shown in FIG. 1 to initiate conversion of the x and y coordinate voltages of the detected touch point Q into corresponding digital values by means of ADC 22.

In prior art pen-touch detection systems, the touch screen controller 1A must monitor the pen-touch detection status either asynchronously or synchronously. Asynchronous monitoring may cause internal glitches in the pen-touch detection circuitry, and synchronous monitoring needs to start the internal clock in advance of the pen-touch detection and requires a continuous-running clock. which results in increased power consumption.

In the prior art, initiation of the pen-touch detection operation is controlled by the host processor 3, which necessitates a continuously running internal clock system and also necessitates associated software required in the host processor 3 for relatively continual communication between the host processor 3 and the touch screen controller. Also, in the prior art the touch screen controller interrupts the host processor 3 to request a convert command (which causes the touch screen controller 1A to initiate analog to digital conversion of the analog coordinate voltages of the touch point Q). When host processor 3 is ready, it is issues the requested convert command. Host processor 3 performs the function of determining the pen-touch status and determining if the detected touch point Q is valid also is removed from the host processor 3. This requires a substantial amount of communication between the host processor 3 and the touch screen controller, which in turn increases overall touch screen system power consumption. If higher clock speeds are needed to increase the speed of communication between host processor 3 and touch screen controller 1A, overall system power is further increased.

Thus, there is an unmet need for a touch screen controller pen-touch detection system and method which results in substantially less system power consumption There also is an unmet need for a touch screen controller pen-touch detection system and method which avoids the need for a host processor to continually poll the touch screen controller to determine pen-touch of a touch screen assembly coupled to the touch screen controller.

There also is an unmet need for a touch screen controller which relieves a host processor of the burden of determining whether a detected touch point is valid.

SUMMARY OF THE INVENTION

It is an object of the invention to provide a touch screen controller pen-touch detection system and method which results in substantially less system power consumption It is another object of the invention to provide a touch screen controller pen-touch detection system and method which avoids the need for a host processor to continually poll the touch screen controller to determine pen-touch of a touch screen assembly coupled to the touch screen controller.

It is another object of the invention to provide a touch screen controller which relieves a host processor of the burden of determining whether a detected touch point is valid.

Briefly described, and in accordance with one embodiment, the present invention provides a touch screen controller circuit (1A) including means for generating a first and second levels of a pen touch signal (PENTOUCH) if a touch point (Q) is present or absent, respectively. A clock start signal (CLKSTART) is generated in response to the first level. An internal clock signal (INTCLK) is generated in response to the clock start signal. First and second levels of a synchronized pen touch signal (PENTOUCH1) corresponding to the first and second levels, respectively, of the pen touch signal are generated in response to the internal clock signal. A stop clock signal (CLKSTOP) is generated in response to the second level of the synchronized pen touch signal. The internal clock signal (INTCLK) is stopped in response to the clock stop signal.

In one embodiment, the invention provides a touch screen controller circuit (1A) for controlling a touch screen assembly including first (30) and second (31) resistive sheets, including a pen-touch detector circuit (2A) including a first transistor (32) controllably coupling a first terminal (x+) of the first resistive sheet (30) to an input of a buffer circuit (38) for generating a first level of an asynchronous pen touch signal (PENTOUCH) if a touch point (Q) exists in the touch screen assembly and for generating a second level of the pen-touch signal (PENTOUCH) if a detected touch point (Q) ceases to exist. A touch-initiated clock system (50) generates an internal clock signal (INTCLK) for internally clocking the touch screen controller circuit (1A), and includes a first circuit (53) responsive to the first level of asynchronous the pen touch signal (PENTOUCH) to generate a clock start signal (CLKSTART). A clock generator (54) starts generation of the internal clock signal (INTCLK) in response to the clock start signal. A second circuit (56) responsive to the internal clock signal (INTCLK) and the asynchronous pen touch signal (PENTOUCH) generates a first level of a synchronized pen touch signal (PENTOUCH1) if the asynchronous pen touch signal (PENTOUCH) is at its first level and generates a second level of the synchronized pen-touch signal (PENTOUCH1) if the asynchronous pen-touch signal (PENTOUCH) is at its second level. A control circuit (57) responsive to the synchronized pen touch signal (PENTOUCH1) and the internal clock signal (INTCLK) generates a stop clock signal (CLKSTOP) if the synchronized pen touch signal (PENTOUCH1) is at its second level. The clock generator (54) is responsive to the clock stop signal (CLKSTOP) to stop the generation of the internal clock signal (INTCLK).

In a described embodiment, the first circuit (53) includes a D-type flip-flop having a preset input coupled to receive the asynchronous pen touch signal (PENTOUCH), a clock input coupled to receive a logical complement ($\overline{INTCLK}$) of the internal clock signal (INTCLK), and a data input coupled to respond to the clock stop signal (CLKSTOP), an output of the D-type flip-flop producing the clock start signal (CLKSTART). The clock generator (54) includes an ANDing circuit (54A) having a first input coupled to receive the clock start signal (CLKSTART) and an output (60) coupled to a first terminal of a resistor (R) and an input of an inverter (54B), an output (61) of the inverter (54B) being coupled to a first terminal of a capacitor (C) and an input of a digital buffer (54C), a second terminal of the resistor (R) being coupled to a second terminal of the capacitor (C) and to a second input (65) of the ANDing circuit (54A), an output (62) of the digital buffer (54C) producing the internal clock signal (INTCLK). The second circuit (56) includes a D-type flip-flop having a clock input coupled to receive the logical complement ($\overline{INTCLK}$) of the internal clock signal (INTCLK) and a data input coupled to receive the asynchronous pen touch signal (PENTOUCH), the synchronized pen touch signal (PENTOUCH1) being produced on an output of the D-type flip-flop.

In a described embodiment, the control circuit (57) includes a finite state machine (57) having a data input coupled to receive the synchronized pen touch signal (PENTOUCH1) and a clock input coupled to receive a logical complement ($\overline{INTCLK}$) of the internal clock signal (INTCLK), wherein the finite state machine (57) performs the functions of (1) generating an interrupt signal (IRQ) and resetting the clock stop signal (CLKSTOP) in response to an occurrence of the first level of the synchronized pen-touch signal (PENTOUCH1), (2) isolating terminals of the touch screen assembly (30,31) from an input of the pen-touch detector circuit (2A) and controlling driver transistors (18,19,20, 21) of the touch screen controller (1A) so as to produce analog voltage representations of coordinates of a detected touch point (Q), (3) controlling analog to digital conversion of the touch point coordinate voltages, and (4) entering the converted representations of the touch point coordinates into a data register (48). The finite state machine (57) resets the interrupt signal (IRQ), goes into an idle mode, and sets the clock stop signal (CLKSTOP) in response to an occurrence of the second level of the synchronized pen touch signal (PENTOUCH1).

In a described embodiment, the complement ($\overline{INTCLK}$) of the internal clock signal (INTCLK) is generated by an inverter (55).

In a described embodiment, the clock generator (54) generates an initial rising edge of the internal clock signal ($\overline{INTCLK}$) in response to a rising edge of the clock start signal (CLKSTART). The signals of the data inputs of the first (53) and second (56) D-type flip-flops are latched therein in response to a rising edge of the logical complement ($\overline{INTCLK}$). In inverter (51) has an input coupled to receive the clock stop signal (CLKSTOP) and an output coupled to a data input of the first D-type flip-flop (53). The finite state machine (57) generates a rising edge of the clock stop signal (CLKSTOP) which causes the inverter (51) to cause the first D-type flip-flop (53) to generate a falling edge of the clock start signal (CLKSTART) that causes the clock generator (54) to stop at a low level of the internal clock signal (INTCLK).

In one embodiment, the invention provides method of operating a touch screen controller circuit (1A) for controlling a touch screen assembly including first (30) and second (31) resistive sheets, including generating a first level of an asynchronous pen touch signal (PENTOUCH) if a touch point (Q) exists in the touch screen assembly or generating a second level of the pen-touch signal (PENTOUCH) if a detected touch point (Q) ceases to exist, a clock start signal (CLKSTART) in response to the first level of asynchronous the pen touch signal (PENTOUCH), starting generation of an internal clock signal (INTCLK) in response to the clock start signal, generating a first level of a synchronized pen touch signal (PENTOUCH1) if the asynchronous pen touch signal (PENTOUCH) is at its first level or generating a second level of the synchronized pen-touch signal (PENTOUCH1) if the asynchronous pen-touch signal (PENTOUCH) is at its second level, generating a stop clock signal (CLKSTOP) if the synchronized pen touch signal (PENTOUCH1) is at its second level, and stopping the generation of the internal clock signal (INTCLK) in response to the clock stop signal (CLKSTOP).

In a described embodiment, the method includes logically ANDing a clock start signal (CLKSTART) with an initial signal on a junction (65) between a resistor (R) and a capacitor (C) of free-running oscillator circuitry to begin generating the internal clock signal (INTCLK), generating the clock start signal (CLKSTART) by applying the asynchronous pen touch signal (PENTOUCH) to a preset input of a D-type flip-flop and applying a logical complement ($\overline{INTCLK}$) of the internal clock signal (INTCLK) to a clock input of the D-type flip-flop, and applying a signal representative of the clock stop signal (CLKSTOP) to thereby produce the clock start signal (CLKSTART) on an output of the D-type flip-flop, and generating the synchronized pen-touch signal (PENTOUCH1) by applying the asynchronous pen touch signal (PENTOUCH) to a data input of a D-type flip-flop and applying a logical complement ($\overline{INTCLK}$) of the internal clock signal (INTCLK) to a clock input of the D-type flip-flop, the synchronized pen touch signal (PENTOUCH1) being produced on an output of the D-type flip-flop.

In a described embodiment, the method includes clocking substantially all digital circuitry in the touch screen controller (1A) by means of the internal clock signal (INTCLK).

In one embodiment, the invention provides a touch screen controller circuit (1A) for controlling a touch screen assembly including first (30) and second (31) resistive sheets, including means (2A) for generating a first level of an asynchronous pen touch signal (PENTOUCH) if a touch point (Q) exists in the touch screen assembly are generating a second level of the pen-touch signal (PENTOUCH) if a detected touch point (Q) ceases to exist, means (51,53) for generating a clock start signal (CLKSTART) in response to the first level of asynchronous the pen touch signal (PENTOUCH), means (53,54A) for starting generation of an internal clock signal (INTCLK) in response to the clock start signal, means (56) for generating a first level of a synchronized pen touch signal (PENTOUCH1) if the asynchronous pen touch signal (PENTOUCH) is at its first level or generating a second level of the synchronized pen-touch signal (PENTOUCH1) if the asynchronous pen-touch signal (PENTOUCH) is at its second level, means (57) for generating a stop clock signal (CLKSTOP) if the synchronized pen touch signal (PENTOUCH1) is at its second level, and means (53,54A) for stopping the generation of the internal clock signal (INTCLK) in response to the clock stop signal (CLKSTOP).

BRIEF DESCRIPTION OF THE DRAWINGS

FIG. 3 is a block diagram of a pen-touch-actuated clock system which can be included to improve the prior art touch screen controller shown in FIGS. 1 and 2 in accordance with the present invention.

FIG. 4A is a detailed diagram of the internal clock circuitry included in block 54 of FIG. 3.

DETAILED DESCRIPTION OF THE PREFERRED EMBODIMENTS

Figure 1:
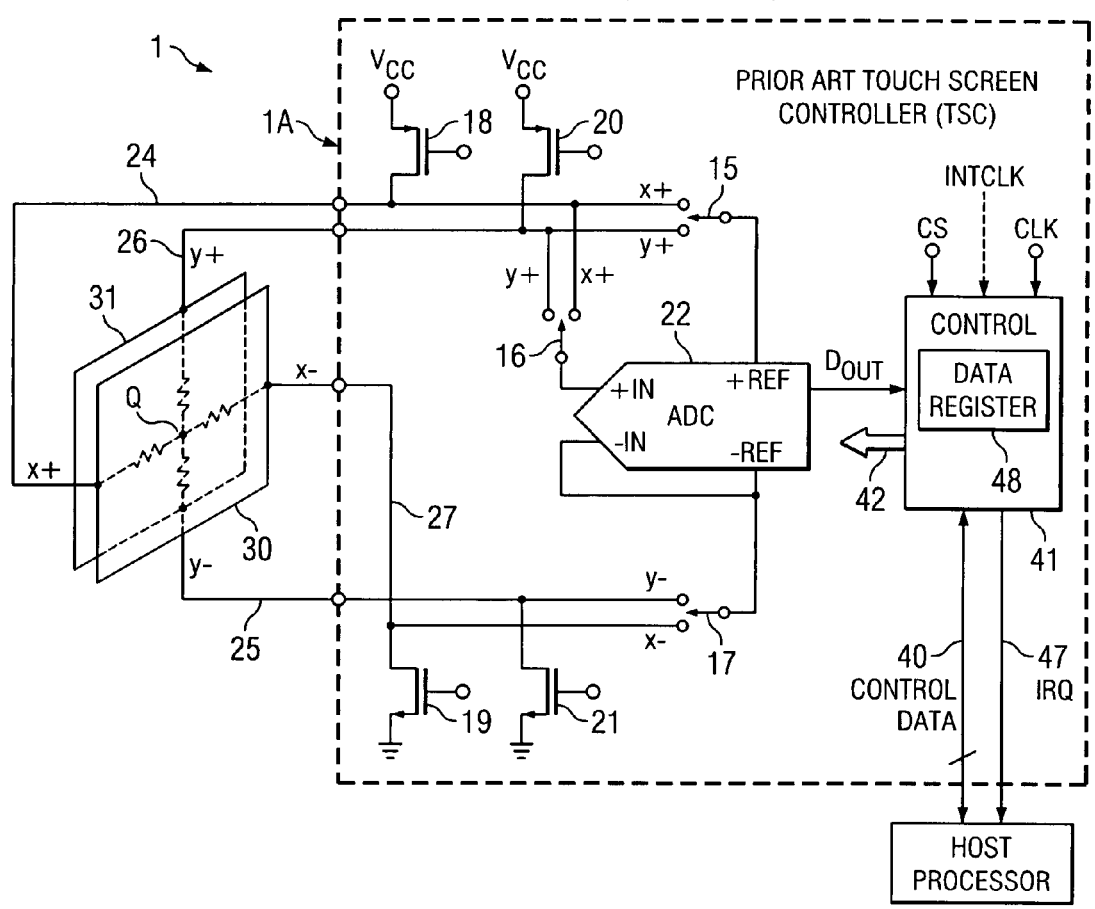
FIG. 1 is a schematic diagram showing the touch point coordinate conversion part of a prior art touch screen controller.
Figure 2:
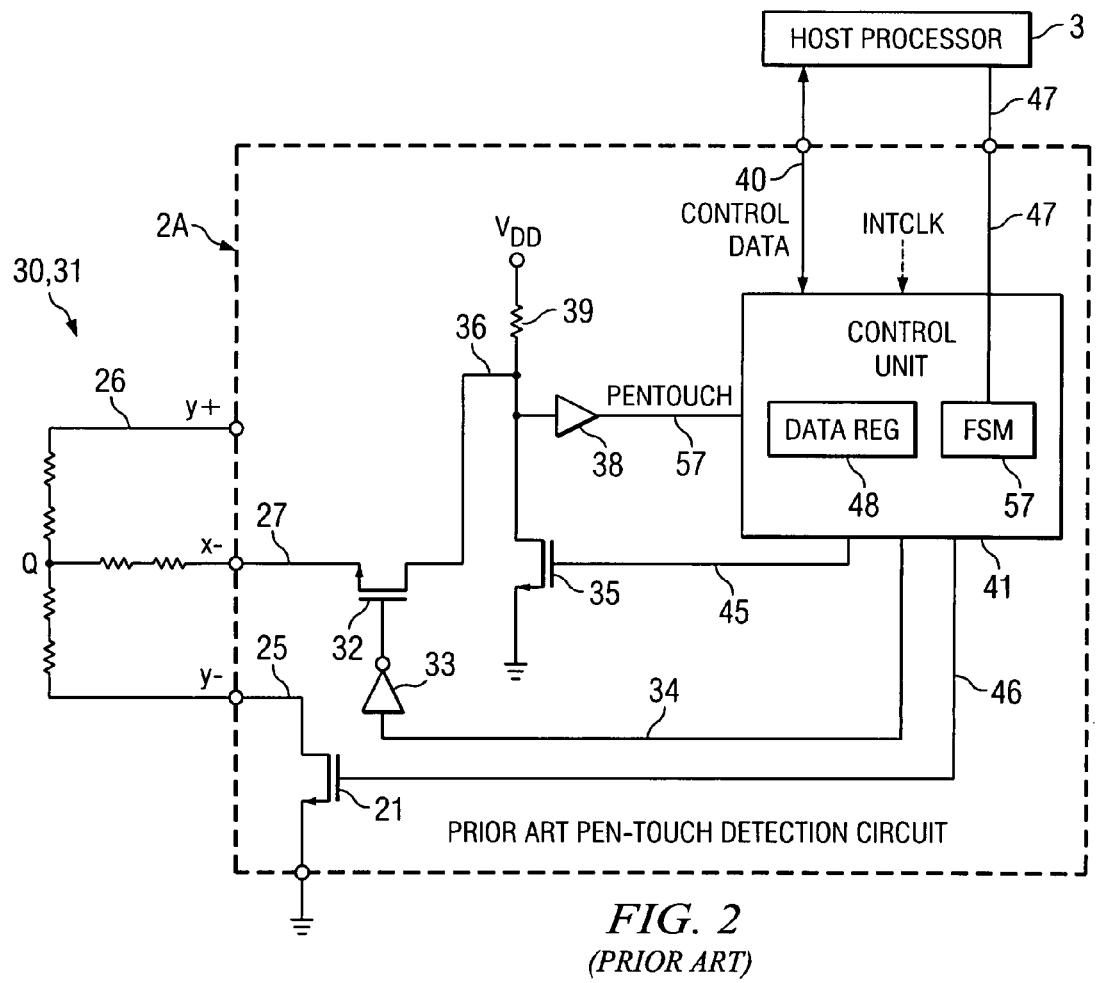
FIG. 2 is a partial schematic diagram showing prior art pen-touch detection circuitry that could be included in the touch screen controller of FIG. 1.

The present invention provides an improved touch-initiated internal clock system that generates an internal clock signal which is used to clock the digital portions of the circuitry shown in above mentioned Prior Art FIGS. 1 and 2. The internal clock signal automatically begins when a touch point is detected, i.e., when the asynchronous pen-touch signal PENTOUCH goes to a low logic level. The internal clock signal Automatically stops when PENTOUCH goes to high logic level, in order to reduce power consumption in the touch screen system. The control circuitry associated with the internal clock system also automatically initiates and controls the operation of the analog to digital conversion of the touch point coordinates of a detected touch point Q and also informs the host processor when the results of the conversion are available for the host processor to read.

Referring to FIG. 3, touch-initiated internal clock system 50 includes a D-type flip-flop 53 having an "active low" preset input connected to conductor 52 of FIG. 2 to receive the "active low" pen touch signal PENTOUCH indicating the presence or absence of a touch point Q on the touch screen array 30,31. The D input of flip-flop 53 is connected to the output of an inverter 51, the input of which receives a clock stop signal CLKSTOP generated on conductor 58 by control circuitry including a finite state machine (FSM) 57, which is included in control unit 41 and is connected to produce the interrupt request signal IRQ on conductor 47. The clock input of flip-flop 53 receives the signal $\overline{INTCLK}$ on conductor 63. $\overline{INTCLK}$ Is the logical complement of an internal clock signal INTCLK generated on conductor 62 by subsequently described internal clock generator 54. The clear (i.e., reset) input of flip-flop 53 receives an initial reset signal CLR. The output of flip-flop 53 produces a clock start signal CLKSTART on conductor 59, which is connected to the input of internal clock circuit generator 54.

Referring to FIG. 4A, internal clock generator 54 includes a NAND gate 54A having one input connected to receive CLKSTART on conductor 59 and an output connected by conductor 60 to one input of a resistor R and to the input of an inverter 54B. The output of inverter 54B is connected by conductor 61 to one terminal of a capacitor C and to the input of a buffer circuit 54C. The other terminal of capacitor C is connected by conductor 65 to the other terminal of resistor R and to the other input of NAND gate 54A. The output of digital buffer circuit 54C generates the above-mentioned internal clock signal INTCLK on conductor 62.

Referring again to FIG. 3, conductor 62 is connected to the input of an inverter 55, the output of which produces the above mentioned logical complement signal $\overline{INTCLK}$ on conductor 63. Conductor 63 is connected to the clock input of a D-type flip-flop 56, the D input of which receives the asynchronous signal PENTOUCH generated by pen-touch circuit 2A of FIG. 2. The output of flip-flop 56 generates a synchronized pen touch signal PENTOUCH1 on conductor 64, and is connected to an input of a conventional finite state machine 57, the clock input of which receives $\overline{INTCLK}$. The signal PENTOUCH1 is synchronized with $\overline{INTCLK}$. Finite state machine 57 operates to produce the functions indicated in subsequently described flow diagram of FIG. 4B.

Internal clock INTCLK clocks all of the digital circuitry in touch screen controller 1A as indicated in FIG. 1, including the pen-touch detection circuitry 2A in FIG. 2A. When INTCLK is stopped, most or all of the digital circuitry (which typically is CMOS circuitry) stops operating. INTCLK is stopped in response to PENTOUCH going from a low-level to a high level, which is the result of the "disappearance" of the previously detected touch point Q. Touch-initiated internal clock system 50 automatically starts running and finite state machine 57 automatically initiates analog to digital conversion of the x and y touch point coordinate voltages of the detected touch point Q into corresponding digital numbers, which then are stored in data register 48. Data register 48 can be read by the host processor 3 via data bus 40 in FIGS. 1 and 2, the host processor 3 does not need to continually poll pen-touch detection circuit 2A to determine the pen-touch status.

In describing the operation of the internal clock system 50 of FIG. 3, it is assumed that finite state machine 57 initially is in its idle state and that the flip-flops 53 and 56 have been reset. when an asynchronous pen touch signal PENTOUCH is received via conductor 52 from pen-touch circuit 2A of FIG. 2, that signal, which is at an "active low" level, is applied to the "negative-logic" preset input of flip-flop 53, which sets its Q output to a "1" level. That causes the CLKSTART signal on conductor 59 to go to a high level.

Referring to FIG. 4A, during an idle mode of finite state machine 57, INTCLK is at a low level, as is the voltage on conductor 61, and conductor 60 is at a high voltage level. The rising edge of CLKSTART causes the output of NAND gate 54A on conductor 60 to go to a low level, since initially though voltage on conductor 65 also is at a "1" level. The low voltage on conductor 60 discharges the voltage on capacitor C through resistor R and thereby causes the voltage of conductor 65 to go to a low level. This starts clock generator circuit 54, which includes a basic free-running oscillator circuit that includes resistor R, capacitor C, and inverter 54B. The voltage of conductor 61 then goes to a high level, generating the first rising edge of INTCLK, and the voltage on conductor 65 goes to a low level. The resulting first rising edge of $\overline{INTCLK}$ causes a high level on the D input of flip-flop 53 to be latched. This causes CLKSTART on conductor 59 to go to a high level, and the oscillator continues running as long as CLKSTART remains at the low level.

Returning to FIG. 3, INTCLK begins with a rising edge, and is inverted by inverter 55 to produce a falling edge of $\overline{INTCLK}$, the rising edge of which then clocks flip-flops 53 and 56. The first rising edge of $\overline{INTCLK}$ latches the "active low" asynchronous signal PENTOUCH into flip-flop 56, producing an active low "synchronized" pen-touch signal PENTOUCH1 on conductor 64, which is input to finite state machine 57. This allows a half-cycle of INTCLK for the above mentioned latching of flip-flops 53 and 56 to occur. Synchronized pen touch signal PENTOUCH1 remains at its active low state until the touch point Q is terminated and causes PENTOUCH to go to a high voltage level which is latched into flip-flop 56 at the time of the next rising edge of $\overline{INTCLK}$.

Figure 4B:
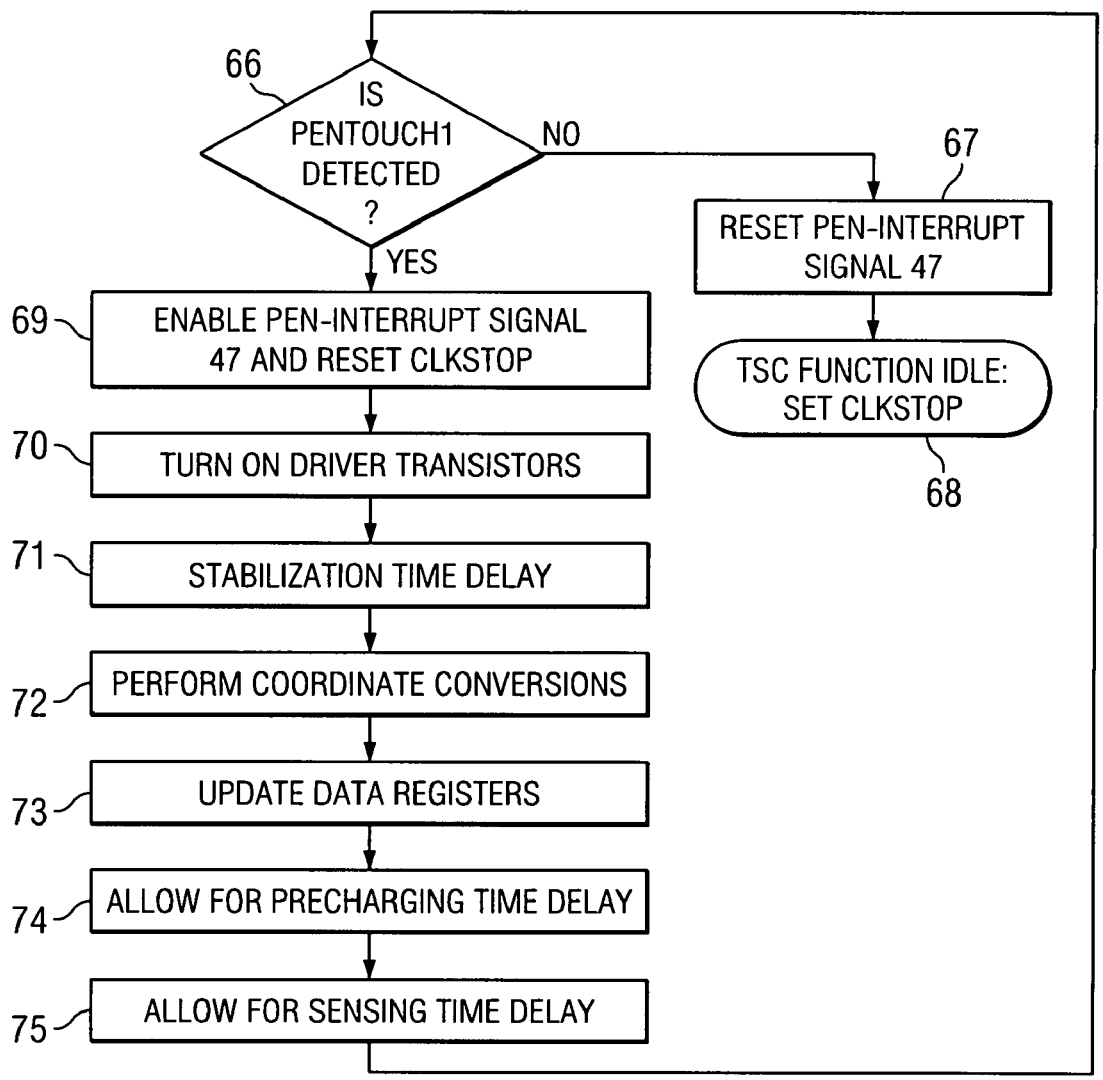
FIG. 4B is a flow chart of the operation of finite state machine 57 in FIG. 3.

Referring to the flowchart of finite state machine 57 shown in FIG. 4B, in decision block 66, finite state machine 57 determines if PENTOUCH1 is present, i.e., is at its active low level. As indicated in block 69, if the determination of decision block 66 is affirmative, then, finite state machine 57 enables the host processor interrupt signal IRQ on conductor 47 (FIGS. 1 and 2) and also resets CLKSTOP to a "0" or low voltage level. That causes inverter 51 in FIG. 3 to produce a "1" on the D input of flip-flop 53. As long as internal clock generator 54 is running, that keeps CLKSTART on conductor 59 at a "1" level, and finite state machine 57 continues to run as long as internal clock generator 54 continues to generate INCLK.

Referring to FIG. 4B, finite state machine 57 (which is included in control unit 41 of touch screen controller 1A) then turns on appropriate driver transistors 18, 19, 20, and 21 to begin the process of measuring the coordinate voltages of the detected touch point Q, as indicated in block 70. After a suitable stabilization time delay indicated in block 71, finite state machine 57 then operates so as to effectuate analog to digital conversions of the various terminals voltages on conductors 24, 25, 26 and 27 of touch screen assembly 30, 31, as indicated in block 72. As indicated in block 73, the digital conversion results then are loaded into data register 48, from which the touch point coordinates can be read by the host processor 3 in response to the above mentioned IRQ signal.

As indicated in block 74, finite state machine 57 then allows adequate time for precharging delays in pen-touch detection circuitry 2A to precharge capacitance associated with conductor 27 B. for turning on transistor 32 to thereby avoid voltage glitches on conductor 57 that could be falsely interpreted as a pen touch detections. As indicated in block 75, finite state machine 57 allows adequate sensing time delay for operation of the signal path including transistor 21, the screen resistances coupled by the touch point Q, transistor 32 and resistor 39, during pen-touch detection.

The algorithm executed by finite state machine 57 then returns to decision block 66, and repeats the above operation if the determination of decision block 66 is affirmative. However, if the determination of decision block 66 is negative, i.e., if PENTOUCH1 goes to a high voltage level, then finite state machine 57 and resets the interrupt signal IRQ on conductor 47 to ensure that no interrupt request is pending in host processor 3, as indicated in block 67. The finite state machine algorithm then goes to block 68 and sets finite state machine 57 to its idle condition and sets CLKSTOP to a "1" level. This causes the D input of flip-flop 53 to go to a "0" level. The next rising edge of $\overline{INTCLK}$ latches that "0" into flip-flop 53 causing CLKSTART to also go to a "0" level. This causes the output of NAND gate 54A to go to a "1" level, which causes the output of inverter 54B to be a "0". This stops operation of internal clock generator 54, with INTCLK at a low level. (By way of definition, it is intended that the basic logical ANDing function performed by an AND gate is to be understood to also be the basic function performed by a NAND gate, irrespective of its additional inverting function.)

Thus, when finite state machine 57 in FIG. 3 recognizes that a touch point Q has terminated, due, for example, to inadequate pen tip pressure, finite state machine 57 goes into an idle state and causes the internal clock to stop. This is in contrast to the power-consuming, time-consuming prior art technique of continuously polling the pen touch detection circuit output signal PENTOUCH to determine whether a false touch point has terminated.

The foregoing technique in effect, actuate synchronization of the asynchronous pen-touch signal PENTOUCH with the starting and stopping of the internal clock signal INTCLK so that jitter of the synchronized pen touch signal PENTOUCH1 is avoided.

As previously mentioned, in the prior art the initiation of the pen-touch detection operation is always controlled by the host processor 3, which necessitates use of the continuously running clock system and associated software required in the host processor 3 and also necessitates continual communication between the host processor 3 and the touch screen controller. Also, in the prior art the touch screen controller interrupts the host processor 3 to request a conversion command, which the host processor 3 issues when it is ready.

As previously mentioned, the above mentioned polling process is a power-consuming, time-consuming process. Touch-initiated internal clock generator 50 substantially reduces power whenever no touch point Q is detected, and also results in substantially reduced burden on the host processor 3 by eliminating the need for it to determine pen-touch status by the above mentioned polling process, thereby eliminating the need for a continuously running clock generation system. Therefore, touch-initiated internal clock system 50 indirectly reduces the power consumption of that would be required by the prior art host processor polling process in order to determine pen-touch status.

In accordance with the present invention, the burden of generating the convert command is removed from the host processor 3. Instead, the touch screen controller automatically initiates the touch point coordinate voltage conversion whenever a touch point Q is detected. The required burden of determining the pen-touch status and determining if the detected touch point Q is valid also is removed from the host processor 3, and hence the associated communication required between the host processor 3 and the touch screen controller is substantially reduced, and also overall touch screen system power consumption also is substantially reduced. Furthermore, somewhat lower clock speeds are needed in touch screen controller 1A as a result of the great reduction in the amount of host processor communication required.

The above described embodiment of the invention also has the advantage of being relatively simple and readily included in a touch screen controller along with the conventional touch screen controller circuitry shown in FIG. 1 and conventional pen-touch detection circuitry shown in FIG. 2.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. An apparatus comprising:
 a plurality of pins;
 a switch network that is coupled to each of the plurality of pins;
 an analog-to-digital converter (ADC) that is coupled to the switch network;
 a controller that is coupled to the ADC;
 a pen-touch detector circuit that is coupled to the switch network; and
 a clock circuit having:
  a first circuit that is coupled to the pen-touch detector circuit, wherein the first circuit generates a clock start signal;
  an ANDing circuit that is coupled to the first circuit so as to receive the clock start signal;
  an resistor-capacitor (RC) circuit that is coupled to the ANDing circuit;
  an inverter that is coupled to the ANDing circuit;
  a buffer that is coupled to the RC circuit and the inverter;
  a second circuit that is coupled to the buffer and the pen-touch detector circuit; and
  a state machine that is coupled to the first circuit and the second circuit.

2. The apparatus of claim 1, wherein the RC network further comprises a resistor and capacitor coupled in series with one another.

3. The apparatus of claim 2, wherein the ANDing circuit further comprises a NAND gate having a first input terminal, a second input terminal, and an output terminal, wherein the first input terminal of the NAND gate is coupled to the first circuit, and wherein the second input terminal of the NAND gate is coupled to a node between the resistor and capacitor, and wherein the output terminal of the NAND gate is coupled to the resistor and the inverter.

4. The apparatus of claim 1, wherein the first and second circuits further comprise D flip-flops.

5. The apparatus of claim 1, wherein the plurality of pins further comprises a first set of pins and a second set of pins, and wherein the apparatus further comprises a touch screen assembly having:
 a first resistive sheet that is coupled to each pin from the first set of pins; and
 a second resistive sheet that is coupled to each pin from the second set of pins.

6. The apparatus of claim 5, wherein the apparatus further comprises a host processor that is coupled to the controller.

7. A touch screen controller circuit for controlling a touch screen assembly including first and second resistive sheets, the touch screen controller circuit comprising:
 a pen-touch detector circuit including a first transistor controllably coupling a first terminal of the first resistive sheet to an input of a buffer circuit for generating a first level of an asynchronous pen touch signal if a touch point exists in the touch screen assembly and for generating a second level of the pen-touch signal if a detected touch point ceases to exist; and
 a touch-initiated clock system for generating an internal clock signal for internally clocking the touch screen controller circuit, the touch-initiated clock system including:
  a first circuit responsive to the first level of the asynchronous pen touch signal to generate a clock start signal;
  a clock generator for starting generation of the internal clock signal in response to the clock start signal, wherein the clock generator includes an ANDing circuit having a first input coupled to receive the clock start signal and an output coupled to a first terminal of a resistor and an input of an inverter, an output of the inverter being coupled to a first terminal of a capacitor and an input of a digital buffer, a second terminal of the resistor being coupled to a second terminal of the capacitor and to a second input of the ANDing circuit, an output of the digital buffer producing the internal clock signal;
  a second circuit responsive to the internal clock signal and the asynchronous pen touch signal to generate a first level of a synchronized pen touch signal if the asynchronous pen touch signal is at its first level and to generate a second level of the synchronized pen-touch signal if the asynchronous pen-touch signal is at its second level; and a control circuit responsive to the synchronized pen touch signal and the internal clock signal to generate a stop clock signal if the synchronized pen touch signal is at its second level, wherein the clock generator being responsive to the clock stop signal to stop the generation of the internal clock signal.

8. The touch screen controller circuit of claim 7, wherein the first circuit includes a D-type flip-flop having a preset input coupled to receive the asynchronous pen touch signal, a clock input coupled to receive a logical complement of the internal clock signal, and a data input coupled to respond to the clock stop signal, an output of the D-type flip-flop producing the clock start signal.

9. The touch screen controller circuit of claim 7, wherein the second circuit includes a D-type flip-flop having a clock input coupled to receive the logical complement of the internal clock signal and a data input coupled to receive the asynchronous pen touch signal, the synchronized pen touch signal being produced on an output of the D-type flip-flop.

10. The touch screen controller circuit of claim 7, wherein the control circuit includes a finite state machine having a data input coupled to receive the synchronized pen touch signal and a clock input coupled to receive a logical complement of the internal clock signal, wherein the finite state machine performs the functions of:
generating an interrupt signal and resetting the clock stop signal in response to an occurrence of the first level of the synchronized pen-touch signal,
isolating terminals of the touch screen assembly from an input of the pen-touch detector circuit and controlling driver transistors of the touch screen controller so as to produce analog voltage representations of coordinates of a detected touch point,
controlling analog to digital conversion of the touch point coordinate voltages, and
entering the converted representations of the touch point coordinates into a data register.

11. The touch screen controller circuit of claim 10, wherein the finite state machine resets the interrupt signal, goes into an idle mode, and sets the clock stop signal in response to an occurrence of the second level of the synchronized pen touch signal.

12. The touch screen controller circuit of claim 7, wherein the complement of the internal clock signal is generated by an inverter.

13. The touch screen controller circuit of claim 7, wherein first circuit includes a first D-type flip-flop having a preset input coupled to receive the asynchronous pen touch signal, a clock input coupled to receive a logical complement of the internal clock signal, and a data input coupled to respond to the clock stop signal, an output of the first D-type flip-flop producing the clock start signal, wherein the second circuit includes a second D-type flip-flop having a clock input coupled to receive the logical complement of the internal clock signal, a data input coupled to receive the pen touch signal, the synchronized pen touch signal being produced on an output of the D-type flip-flop, the synchronized pen touch signal being produced on an output of the D-type flip-flop, and wherein the complement of the internal clock signal is generated by an inverter.

14. The touch screen controller circuit of claim 13, wherein the control circuit includes a finite state machine having a data input coupled to receive the synchronized pen touch signal and a clock input coupled to receive the logical complement of the internal clock signal, wherein the finite state machine performs the functions of generating an interrupt signal and resetting the clock stop signal in response to an occurrence of the first level of the synchronized pen-touch signal,
isolating terminals of the touch screen assembly from an input of the pen-touch detector circuit and controlling driver transistors so as to produce analog voltage representations of coordinates of a detected touch point,
controlling analog to digital conversion of the touch point coordinate voltages,
entering the converted representations of the touch point coordinates into a data register, and
wherein the finite state machine resets the interrupt signal, goes into an idle mode, and sets the clock stop signal in response to an occurrence of the second level of the synchronized pen touch signal.

15. The touch screen controller circuit of claim 14, wherein the clock generator generates an initial rising edge of the internal clock signal in response to a rising edge of the clock start signal.

16. The touch screen controller circuit of claim 15, wherein the signals of the data inputs of the first and second D-type flip-flops are latched therein in response to a rising edge of the logical complement.

17. The touch screen controller circuit of claim 13, wherein each of the first and second D-type flip-flops has a reset input coupled to receive an initial reset signal.

18. The touch screen controller circuit of claim 16, including an inverter having an input coupled to receive the clock stop signal and an output coupled to a data input of the first D-type flip-flop.

19. The touch screen controller circuit of claim 18, wherein the finite state machine generates a rising edge of the clock stop signal which causes the inverter to cause the first D-type flip-flop to generate a falling edge of the clock start signal that causes the clock generator to stop at a low level of the internal clock signal.

20. A method of operating a touch screen controller circuit for controlling a touch screen assembly including first and second resistive sheets, the method comprising:
generating a first level of an asynchronous pen touch signal if a touch point exists in the touch screen assembly or generating a second level of the pen-touch signal if a detected touch point ceases to exist;
generating a clock start signal in response to the first level of the asynchronous pen touch signal;
logically ANDing the clock start signal with an initial signal on a junction between a resistor and a capacitor of free-running oscillator circuitry to begin generating an internal clock signal;
generating a first level of a synchronized pen touch signal if the asynchronous pen touch signal is at its first level or generating a second level of the synchronized pen-touch signal if the asynchronous pen-touch signal is at its second level;
generating a stop clock signal if the synchronized pen touch signal is at its second level; and
stopping the generation of the internal clock signal in response to the clock stop signal.

21. The method of claim 20 including clocking substantially all digital circuitry in the touch screen controller by means of the internal clock signal.

22. The method of claim 20, wherein the method further comprises generating the clock start signal by applying the asynchronous pen touch signal to a preset input of a D-type flip-flop and applying a logical complement of the internal clock signal to a clock input of the D-type flip-flop, and applying a signal representative of the clock stop signal to thereby produce the clock start signal on an output of the D-type flip-flop.

23. The method of claim 20, wherein the method further comprises generating the synchronized pen-touch signal by applying the asynchronous pen touch signal to a data input of a D-type flip-flop and applying a logical complement of the internal clock signal to a clock input of the D-type flip-flop, the synchronized pen touch signal being produced on an output of the D-type flip-flop.

* * * * *